United States Patent [19]

Lebarbier et al.

[11] Patent Number: 5,055,251
[45] Date of Patent: Oct. 8, 1991

[54] PROCES AND APPARATUS FOR FORMING EXTREMITIES OF TUBES

[75] Inventors: Armand Lebarbier, Varennes-Vauzelles; Michel Deschamps, Nevers, both of France

[73] Assignee: Caoutchouc Manufacture et Plastiques S.A., Versailles Cedex, France

[21] Appl. No.: 486,014

[22] Filed: Feb. 28, 1990

[30] Foreign Application Priority Data

Mar. 2, 1989 [FR] France .................. 89 02879

[51] Int. Cl.$^5$ .................. B29C 33/50; B29C 35/02
[52] U.S. Cl. .................. 264/313; 264/318; 264/320; 264/334; 264/347; 264/DIG. 59; 264/293; 425/393; 425/403; 425/440; 425/385
[58] Field of Search ............. 264/313, 318, 299, 334, 264/336, 319, 347, 320, DIG. 59, DIG. 66, 293; 425/392, 393, 403, 440, DIG. 44, 385; 249/61, 63, 64, 134

[56] References Cited

U.S. PATENT DOCUMENTS

| | | | |
|---|---|---|---|
| 3,353,220 | 11/1967 | Lenable | 264/313 |
| 3,814,565 | 6/1974 | Cahour et al. | 425/393 |
| 4,134,784 | 1/1979 | Badberg et al. | 425/393 |
| 4,298,330 | 11/1981 | Davis | 264/313 |

FOREIGN PATENT DOCUMENTS

| | | | |
|---|---|---|---|
| 2737277 | 3/1979 | Fed. Rep. of Germany . | |
| 2737278 | 3/1979 | Fed. Rep. of Germany | 425/403 |
| 2195935 | 3/1974 | France . | |
| 2518014 | 6/1983 | France . | |
| 2548086 | 1/1985 | France . | |
| 249222 | 9/1987 | German Democratic Rep. . | |
| 60-155439 | 8/1985 | Japan | 264/334 |
| 62-19414 | 1/1987 | Japan . | |
| 62-256614 | 9/1987 | Japan . | |
| 63-74603 | 4/1988 | Japan | 264/313 |
| 1049258 | 10/1983 | U.S.S.R. | 425/393 |
| 1331660 | 8/1987 | U.S.S.R. . | |

Primary Examiner—Jeffery Thurlow
Assistant Examiner—Mathieu Vargot
Attorney, Agent, or Firm—Nils H. Ljungman & Associates

[57] ABSTRACT

Forming process, during vulcanization on a mandrel, of the end portions of rubber tubes, using a tool having a radially deformable skirt in the form of a corolla, made of vulcanized rubber which encloses the end portions of rubber tubes using solely the action of the circumferential elasticity of its corolla. The disengagement of the part after vulcanization is accomplished by a simple axial thrust on the corolla. An upturned position of the radially deformable skirt makes possible the installation of the rubber tubes and other preparation operations.

24 Claims, 3 Drawing Sheets

FIG_2

FIG_3

FIG_4

5,055,251

PROCESS AND APPARATUS FOR FORMING EXTREMITIES OF TUBES

BACKGROUND OF THE INVENTION

1. Field of the Invention

The present invention relates to a process and apparatus for forming rubber bodies and, more specifically, for forming rubber bodies such as tubes during vulcanization.

2. Background Information

French Patent No. 2,548,086 describes a process for the fabrication of a profiled rubber tube using extremity molds called "cylindrical molding caps" which are made of stainless steel or a mild steel.

In the same document, there is a description of a removable cylindrical holding cap which is made of a rubber material, but this element is in no way intended for the molding of the extremities of the tube. This patent specifies that the removable cylindrical molding cap is to be placed on the other portion of the extremity of the mandrel so as to exert an axial compression force on the unvulcanized rubber tube.

The molding of the extremities of the flexible tube is, thus, realized by a rigid cylindrical molding cap, and not by a radially deformable skirt made of a vulcanized elastomer compound as in the instant application. Therefore, French Patent No. 2,548,086 can not be considered pertinent to the instant application.

French Patent No. 2,195,935 relates to a device for molding objects by means of an inflatable, flexible mold and, thus, requiring the utilization of fluid for the inflation thereof.

French Patent No. 2,518,014 (Class A) describes, in a very general manner, a process for the realization of a "bent flexible conduit" in which the extremities of the blank are fixedly held in relation to the mandrel or are clamped onto it by rigid means. The process described in this document is, therefore, only part of the technological background of the invention which is the subject of the instant application.

The present invention relates to the fabrication of flexible tubes which may be used for connecting two terminals of a cooling circuit on a motor or on other machines, such as the connecting elements intended for use on automobiles, but generally, for use in any circulation of fluid in industrial, agricultural or similar equipment.

The invention relates, in particular, to the making of sections of curved tubes, which are specially shaped to fit crowded passages. These sections of tubes are produced by vulcanization of an elastomer such as a polymer, an elastic rubber or a like substance in the form of a tube or tubing piece. The tubing piece to be vulcanized is preferably formed by an extrusion process and, then, subsequently threaded over a mandrel for further processing.

Supplying parts to the automobile industry, due to the demand for the mass production of the components used, requires the selection of the most economical process for the fabrication of products to perform a function, even if the products can also be made in other somewhat more expensive ways. Thus, the molding of rubber tubes having complex shapes, although possible to manufacture, has virtually been completely replaced, for reasons of economy, by the pre-formed tubes. These pre-formed tubes or hoses generally comprise an internal tube, quite often reinforced by braided or knitted fabrics, or by the continuous wrapping of textile fibers. The passage of the reinforced internal tube through an extruder with a square-die makes it possible to cover this reinforcement with an elastomer coating. This operation, usually performed continuously, is followed by the cutting-tolength of the at least partially unvulcanized tubing, which is then forcibly engaged over a mandrel; thus, giving the tubing a definitive desired shape. The tube is then vulcanized and disengaged from the mandrel by the use of a force.

This process for the fabrication of tubular connecting elements, which is very widely-used, is followed, as necessary, by a reinforcement of textile adhesive tape, with or without cutting-to-length, as a function of the required precision and surface quality of the outer surface and/or end of the tube, and as a function of the utilization requirements. Since, in the majority of cases, a collar is used to secure the attachment to the terminal, the manufacturers generally desire a degree of precision in the thickness, the surface and the positioning of the extremities. This precision can not always be achieved by the vulcanization process, without the use of a mold, in the autoclave, or other furnace used for vulcanization.

Various improvements aim at locally refining the geometry of these extremities, without changing over to the excessively expensive mass production molding of such voluminous parts, since the parts are usually reinforced with textiles to increase their rigidity or their bursting strength. One of the most recent processes is disclosed in Soviet patent SU 1,331,660 (KHOMSKOV), in which the mechanization of a ramp carrying several curved mandrels, after the flexing of the tubular blanks, makes possible the simultaneous vulcanization in an autoclave of several identical connection elements.

The internal surface and the surfaces of the extremities are supported during the vulcanization and, therefore, have a surface quality which is better than that obtained by means of the so-called "free state curing" process, and thus eliminates the need for a subsequent cutting-to-length process. This process of the prior art, usually, does not improve the regularity of the outside diameter or the thickness of the connection element or the quality of the external surface of the tubing piece.

The East German Patent DD 249222 (VEB GUM-MIW.THURINGEN) discloses a process for molding raw tubular blanks in female molds using an internal gas or liquid pressure. This process can ensure a good exterior surface quality, but it does not solve the problem of the ovalization of the connecting elements or the problem of maintaining a constant thickness. The process, also, requires the utilization of molds which are heavy, on account of their large dimensions, and does not have the advantage of the high vulcanizing pressure customary in molding, since the pressure used in the technology described is only steam pressure.

On the other hand, Japanese Patent J62-256.414 (TOYODA) discloses an internal mandrel terminal which makes it possible, during vulcanization, to shape the spread extremities of a tube by vulcanization in an autoclave. Here again, the process does not solve the problem of achieving a constant thickness.

Japanese patent J62-019.414 (TOKAI RUBBER) relates to threading a blank or tubing piece on a molding mandrel. It discloses the fastening at each extremity of a cylindrical sleeve, inside of which are two jaws which are closed on the blank or tubing piece by means of screws. These jaws are engaged over the mandrel and make it possible to shape the rubber piece, as desired, by the partial molding of the exterior surface, such as the molding of flanges designed to hold a collar.

The assembly operation of the above mentioned art, using screws, and the removal operation after vulcanization in the autoclave are accompanied by the well-known problems of molding, without utilizing the advantage of a high pressure. The process can provide a satisfactory, exterior shape, and can verify correct centering in relation to the internal mandrel. However, this process does not assure that the material will fill the entire mold. For example, a burr between the two halves of the mold can interfere with the installation of a collar, or can necessitate a deburring operation.

OBJECTS OF THE INVENTION

It is an object of the invention to provide a process for forming the ends of rubber tubes, hoses or other objects on a mandrel during vulcanization. The tool used in this process preferably uses a radially or other extendible deformable skirt, preferably made of vulcanized rubber, which encloses the end portion of the at least partially unvulcanized tubing piece.

The elasticity of the deformable skirt, which skirt preferably has a circumferential corolla-shaped surface area, exerts a force on the tubing piece to hold the tubing piece in place and to form the tubing during vulcanization. After vulcanization, the disengagement from the skirt, of the part of tubing piece in contact with the skirt, is achieved by a simple thrust to lift and push away the skirt, thereby releasing that part of the tubing piece. This thrust is preferably exerted axially on the corolla-shaped surface area of the deformable skirt when the corolla-shaped surface area is in an upturned position. Such a force preferably displaces the radially deformable skirt after the tubing piece is completely formed and vulcanized. When folded back, the preferably, radially deformable skirt, then, facilitates the insertion of a new tubing piece between the mandrel and the skirt in preparation for vulcanization.

Another object of the invention is to provide an apparatus for performing the forming process of rubber tubes, hoses or other objects on a mandrel during vulcanization.

SUMMARY OF THE INVENTION

The present invention seeks to eliminate or at least minimize some of the disadvantages or excessive costs of many of the processes of the prior art, without modifying the technique of extrusion of a section of tubing threaded on a vulcanization mandrel in an autoclave. The present invention makes it possible to mold reliefs, depressions or even raised portions on the exterior surface of the tubular connection element which raised portions or flanges could assist in the axial positioning of a collar. The process also makes it possible to make or mark shoulders, which may prevent a tangent screw collar from readily turning and thus easily escaping a screwdriver, as well as making any desired markings, either engraved or in relief on the tubular connection element.

These tubing shapes do not necessarily have a regular, rigorous periphery imposed on them by a rigid mold, but the present invention makes possible better control and verification of a constant thickness of the tubing piece which is subject to the dispersion inherent to the extrusion process.

This invention relates to a forming process, during the vulcanization on the forming mandrel, of the end portions of tubing made of elastomer compound, which may include a continuous or discontinuous textile reinforcement. The invention further relates to the apparatus which makes the performance of this process possible.

The invention is characterized by the fact that a radially deformable skirt made of vulcanized elastomer compound, which makes it possible to reproduce a specified geometry, is connected to a fixed or movable ring, against which the end of a section of tubing abuts. A radially deformable skirt usually encloses the end portion of a tubing piece and exerts on the end portion a slight pressure solely under the action of the circumferential elasticity of its corolla-shaped surface area. The deformable skirt is also preferably characterized by the fact that a slight axial thrust P on the corolla-shaped surface area suffices to disengage the end portion of the tubing piece after vulcanization.

The radially deformable skirt constitutes the tooling associated with the process which makes possible its performance.

BRIEF DESCRIPTION OF THE DRAWINGS

The invention is explained in greater detail below with reference to the accompanying drawings, in which.

DESCRIPTION OF THE PREFERRED EMBODIMENTS

Figure 1:
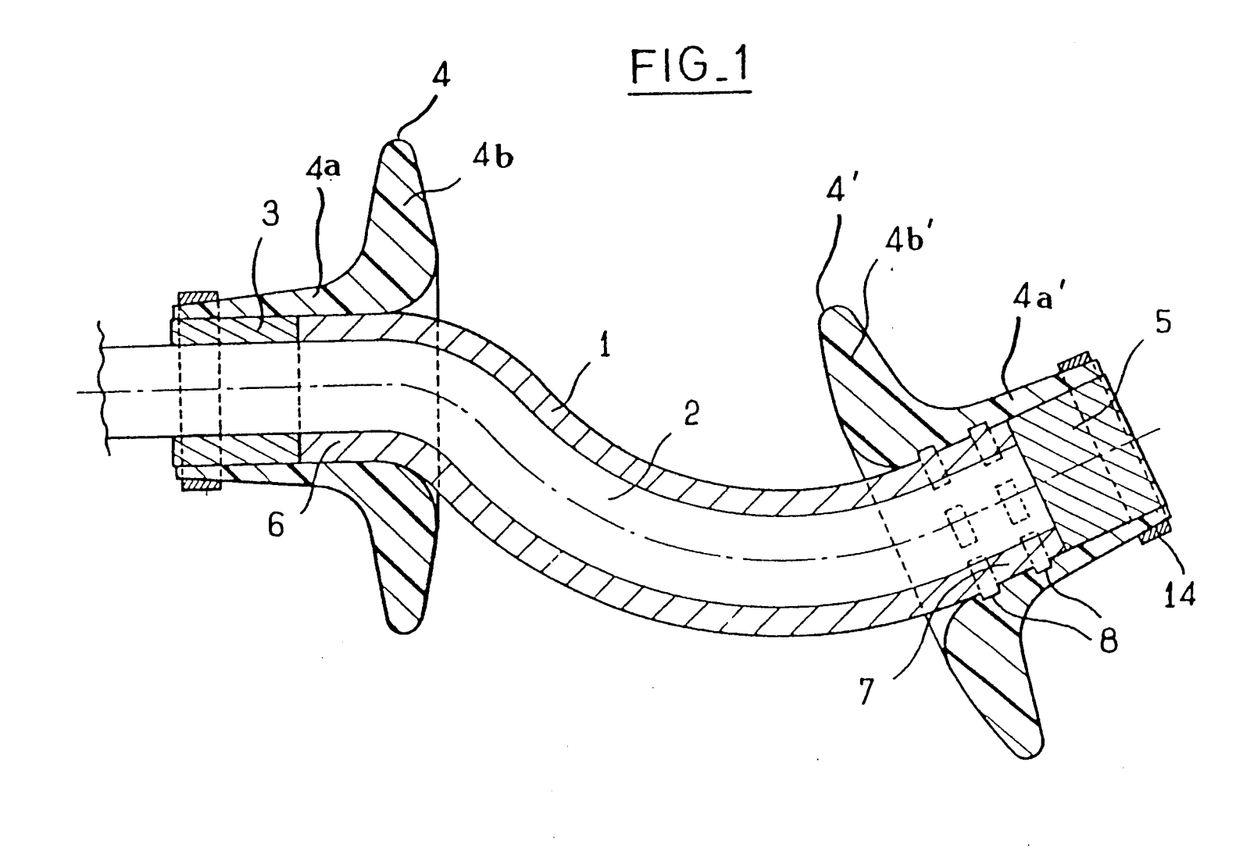
FIG. 1 is an axial cross-sectional view of a forming apparatus equipped with two flexible means having radially deformable skirts positioned to support and surround a partially unvulcanized tubing during vulcanization.

FIG. 1 is a cross-sectional view of the forming apparatus as it is used in the vulcanization process, which can occur, for instance, inside a pressurized chamber used for vulcanization, such as an autoclave. Two flexible means are shown supporting and surrounding their corresponding end portion of a partially unvulcanized tubing piece 1. The tubing piece may generally consist of a defined length of at least partially unvulcanized rubber or other suitable material. Alternately, a tubing piece may have an internal tube with a textile reinforcement and/or may have been coated with a rubber-like material by means of a square-die extruder.

The tubing 1, being preferably very deformable, is threaded over a metal shaft such as the mandrel 2. Cross-sectionally, the mandrel 2 may be cylindrical, elliptical, oval, conical or irregularly shaped throughout and at each end, depending on the configuration desired. In FIG. 1, a preferred embodiment of the invention, the mandrel 2 is pictured as cylindrical, having the same diameter at each end. The longitudinal axis of mandrel 2 may be straight, in one plane only or may be curved, extending into different planes as is illustrated in FIG. 1. According to the invention, deformable tubing of varying lengths, diameters and shapes may be fitted over suitable mandrels to obtain more preferred configurations.

In FIG. 1, two flexible means are illustrated, one means located at the fixed end of the mandrel which is preferably permanently connected to a fastening means and handling means (not shown). The other flexible means is moveably and removeably located at the other end of the mandrel. The end portion 6 of the tubing 1, which has been threaded on the mandrel 2, is butted up against the ring 3 on the mandrel 2 and is adjacent to the shoulder 4a of the flexible means 4. The shoulder 4a of flexible means 4 encompasses a ring 3 and is clamped to the ring by means of a hold-down collar 14 on the fixed side of the mandrel 2. On the other moveable and removeable end of mandrel 2, the end portion 7 of tubing 1 is butted against ring 5 and is adjacent to the shoulder 4a' of second flexible means 4'. Similarly, the shoulder 4a' of flexible means 4' encompasses the ring 5 and is clamped to the ring 5 by means of the hold-down collar 14'. The flexible means 4, 4' have preferably extending portions or radially deformable skirts 4b and 4b' for supporting and shaping the ends of the tubing.

After installation of the tubing 1 and in order to firmly secure the tubing 1, the operator executes a simple operation using for example, bayonet or cotter pins to lock movable ring 5. Ring 3 may also be locked by a similar structure and may be permanently mounted on mandrel 2.

In case of defects in cutting the end portions of tubing 1, the operator can still visually inspect the contact with the rings 3 and 5, because the two radially deformable skirts 4b and 4b' can, at this time, be tucked up in a stable equilibrium with a slight tension on the parts of their radial deformable skirts 4b, 4b' which have a corolla-shaped surface area 11. A removal or milling of the tubing material is still possible to eliminate any defect on the ends thereof before returning the two skirts 4b, 4b' to their equilibrium position being a substantially unstretched position, thus enclosing end portions 6, 7 of tubing piece 1.

In the embodiment, illustrated by way of a non-restricting example, end portion 6 has a smooth cylindrical exterior surface imposed on the tubing 1 by the slight tightening action of the radially deformable skirt 4b which is fastened to ring 3. When the elastomer compound, of which the tubing is made, becomes relatively fluid at the beginning of vulcanization, the fastening action of ring 3 may assist somewhat in the tightening action of the at least radially deformable skirt 4b.

In other, alternate embodiments, the internal, cylindrical surface of the radially deformable skirt 4b may have all the engraved or relief markings which the application may require. This technology makes possible the reproduction of logos, trademarks or inscriptions with the small deformations allowed by the hardly-deformed position assumed by the inside diameter of the radially deformable skirt 4b in contact with the tubing 1.

The pressure exerted by the radially deformable skirt 4b on the end portion 6 must be limited to such a degree as required to take into account the viscosity of the tubing, and to keep the elastomer compound from accumulating undesirably in the uncovered portion of the tube piece since the uncovered portion surrounds the rest of the mandrel 2.

At end portion 7, FIG. 1 illustrates the possibility according to the invention, of forming two flanges 8 or sets of projections which make a relief portion on the cylindrical surface of end portion 7 of the finished tubing piece 1.

These flanges, made possible by the forming apparatus and process without any substantial additional expense incurred, may be either continuous or consist of several separate elements. Such flanges or similar configurations may be preferred for the positioning of the collars, for instance, which are often customarily used in conjunction with a tubular connecting piece or element.

Figure 2:
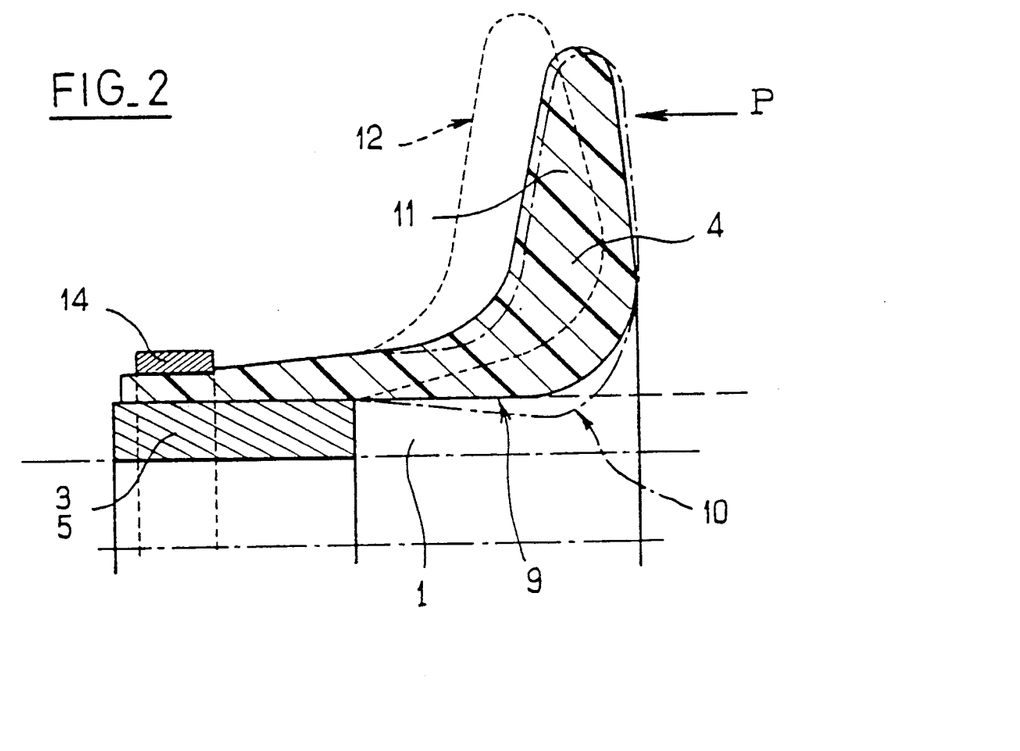
FIG. 2 is a detailed, axial cross-sectional view of a flexible means of a forming apparatus, according to the invention, illustrating the working, resting and releasing positions of the radially deformable skirt of the flexible means.

FIG. 2 is a detailed axial, partial cross sectional view, of a radially deformable skirt 4b which forms a part of the flexible means 4 and which can be attached by a ring 3 engaged on the mandrel 2 and, in the same geometry, mounted on the movable or removeable ring 5.

The working position of the radially deformable skirt 4b is represented with solid lines. The inner surface 9 of skirt 4b is preferably, essentially cylindrical and is located adjacent to the end portion 6 of the tubing 1 which abuts ring 3, or on the other end of the tubing 1, the end portion 7 abuts ring 5. In this working position, a slight pressure is exerted on the end portion 6 of tubing 1 for providing in place support and shaping forces. The rest position 10 of the radially deformable skirt 4b is shown with the long-short dashed line. The skirt 4b assumes a rest position when it is no longer subject to tensile stresses or outside forces which occur such as when the tube piece is inserted thereunder.

In the working position, stress is distributed over the entire mass of the skirt 4b, thereby the skirt advantageously exerts a low pressure on the outside surface of the tubing 1, even at the vulcanization temperatures.

In addition, the ability of the skirt to be deformable preferably allows the escape of any gases which may have been trapped in the elastomer compound during the vulcanization.

A major defect of the desired material used or viscosity thereof could occur with the piece of vulcanized tubing lacking a uniform thickness. This lack of uniform thickness could interfere with the proper application and use of the tube piece, particularly, if the portions away from the zone shaped by and to be supported by the collar portion adjacent to shoulder 4a, did not have uniform thickness, even though the proper thickness might still be achieved on the portion of the end adjacent the extreme surface of the piece. In those places, adjacent to rings 3 and 5, the proper thickness is imposed by the thickness of the rings 3 and 5. Such a fabrication defect is made more apparent by the appearance of a difference in level between the part made smooth by the contact of the radially deformable skirt 4b and the part vulcanized while exposed and not supported by the skirt 4b, since the exposed portion is almost always more irregular in appearance. This detection of defective pieces can advantageously be automated, because it is measurable.

An intermediate position 12 of the radially deformable skirt 4b is represented by short evenly spaced dashed lines. This intermediate position illustrates the beginning of deformation assumed by the radially deformable skirt 4b under the effect of an axial thrust P exerted on it. The axial thrust almost immediately disengages the surface of the inner surface 9, which may be marked by reliefs. The axial thrust makes it possible to easily disengage the piece, first by unlocking the movable ring 5, and then by disengaging the finished piece, by pushing naturally on the corolla-shaped surface area 11 of the skirt 4b.

Figure 3:
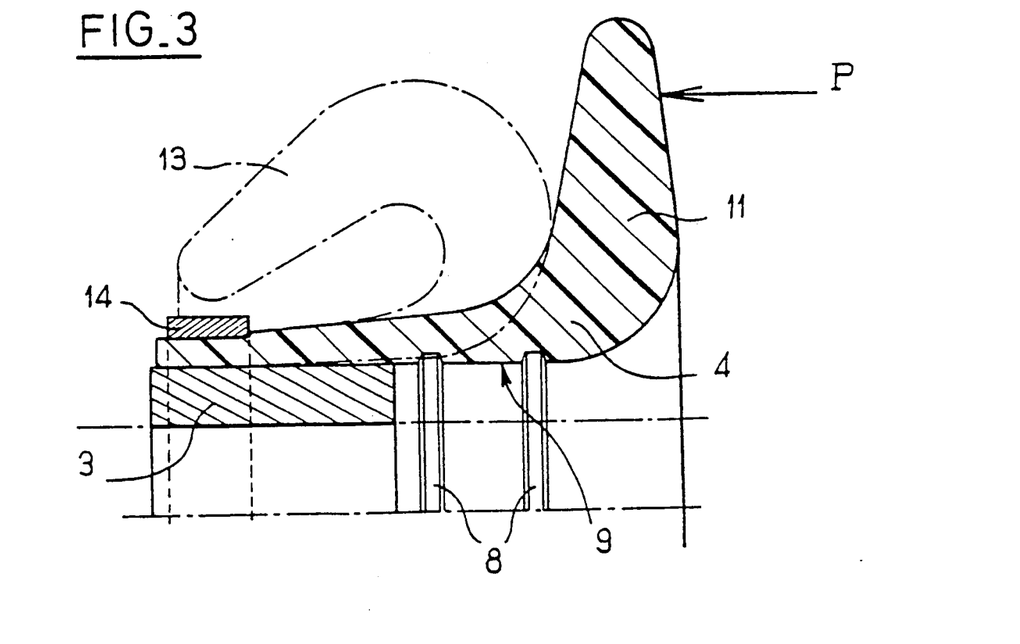
FIG. 3 is a sectional view of one of the flexible means which could be used with the embodiment as shown in FIG. 2, and further illustrates the upturned position of the flexible means which may allow for the placement of unvulcanized tubing.
Figure 4:
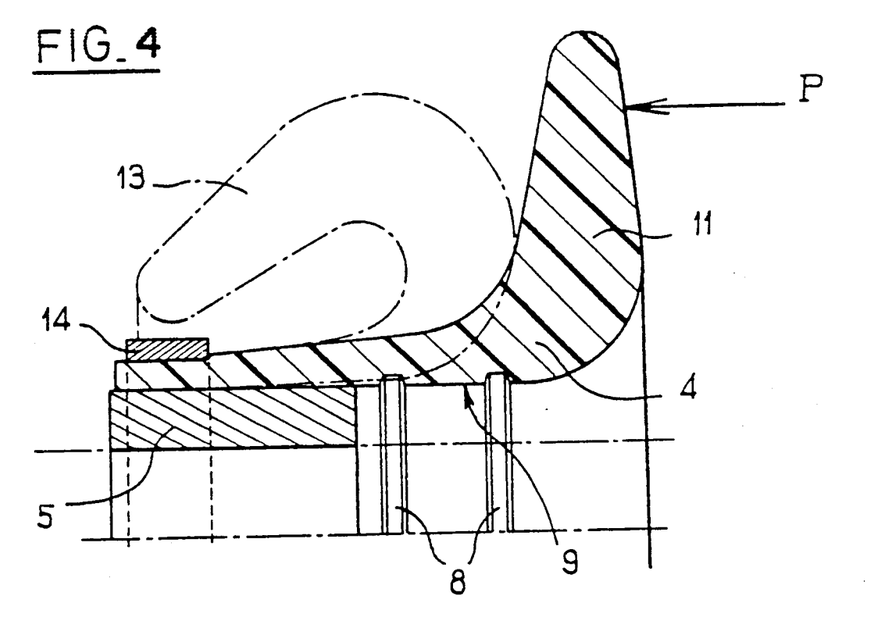
FIG. 4 is a sectional view of another of the flexible means which could be used with the embodiment as shown in FIG. 2, and further illustrates the upturned position of the flexible means which may allow for the placement of unvulcanized tubing.

FIG. 3 is also an axial, partial cross sectional view of a radially deformable skirt 4b, comparing the working position, shown by solid lines, and an upturned position 13, shown by long-short dashed lines. The upturned position 13 is obtained by increasing the axial thrust P on the corolla-shaped surface area 11. This upturned position may be effectively stable on account of the circumferential tension of the surface area 11.

The upturned position 13 is possible, at temperatures below the vulcanization temperature in the autoclave during the preparation process when the partially unvulcanized tubing 1 is placed on the mandrel 2, because of the deformability of the skirt 4b is affixed on ring 3 and is positioned on the mandrel 2 tooling constituted by the radially deformable skirt 4b. The by tightening a hold-down collar 14, which preferably covers at most one-half of the length of the ring 3.

This arrangement allows the flexible means 4 with the radially deformable skirt 4b to slide along the exposed portion of the ring 3 when flexible means 4 is maneuvered by an axial thrust P on the corolla-shaped surface area 11. To extend the useful life of the radially deformable skirt 4b, the upturned position 13 must preferably be used only for short periods of time corresponding to the preparation process. The upturned position 13 which is preferably stable, should be avoided during normal vulcanization fabrication processes. However, during insertion and removal of the tubing, the present invention has the advantage of leaving both the operator's hands free. The upturned position 13 should be reserved for any retouching operations which may be required.

Creep, resulting from keeping the skirt in this upturned position 13, could adversely affect the rest position 10. Consequently, it would also adversely affect the working position which the inner surface 9 of the radially deformable skirt 4b should remain essentially cylindrical. Also, in this working position, the flanges 8 and/or the markings to be reproduced on the tubing pieces are formed. However, a deformation of the skirts due to age, or wear and tear could cause an undesirable change in the shape of all the tubing pieces fabricated subsequently.

The deformation of the skirt surface area in question or the appearance of surface cracking could indicate the end of the useful life of such a deformable apparatus. The cross-linking of the elastomer compound, of which the flexible means is made, continues to occur during the fabrication of each piece, and may cause a gradual increase in the rigidity of the radially deformable skirt 4b and of its corolla-shaped surface area 11. An increase in the rigidity of the skirt can make the tool unusable, since deformability of the skirt constitutes an important aspect of the invention.

Nevertheless, since the life of the radially deformable skirt 4b is usually measured in hundreds of fabrication cycles, the cost of its replacement usually has only a small effect on the cost of the finished pieces.

The elastomers required for fabrication, by molding, of the flexible means 4, 4' having the radially deformable skirts 4b, 4b' respectively are preferably selected from the vast range of synthetic elastomers including those elastomers in particular which exhibit endurance at elevated temperatures and could assure a sufficient useful life. By way of non-restricting examples, the elastomers advantageously selected will preferably be capable of resisting, temperatures higher than 140 degrees C. continuously or during relatively long periods of time and/or frequently repeated uses.

Preferably, the elastomer compound constituting the radially deformable skirts 4b, 4b' uses, as its base elastomer, a terpolyumer of ethylene, propylene and a diene monomer (designated EPDM in Standard ASTR D 1418), a silicon elastomer of the polysiloxane type (VMQ, PVMQ, MQ, PMQ), a polyacrylate (ACN or ANM), an ethylene/acrylic copolymer or fluorinated polymers of the perfluoroelastomer (FFKM) type, fluoro-silicon such as fluoro vinyl methyl siloxane (FVMQ) or fluoro-carbons such as fluorinated hydrocarbons (FK).

The elastomer compound may include two or more of these elastomers, as a function of the relative compatibility. The other components of the elastomer compound, such as cross-linking agents, antioxidants, and the reinforcement additives are selected by the formulator, to contribute to the improvement of strength at elevated temperatures. The flexible means 4 with the radially deformable skirt 4b is made by molding the elastomer compound, in the impression of a closed mold in which there is an element having the forms, markings or flanges to be reproduced, which element is advantageously movable or removable, to make possible the flexible fabrication of different shapes in the same mold.

In conclusion, the shaping process according to the invention and the resulting variant shapes or combinations of impressions make it possible, by means of the use of a vulcanization process of the prior art of a mandrel in an autoclave, to economically apply reference markings and possibly operating instructions to an elastomeric part or tubing piece. A special advantage of the present invention is its ability to form raised flanges, of a height suitable to that of the installation of collars. These flanges can be continuous, or may consist of discontinuous elements. These flanges preferably securely hold a collar installed during preparation outside an assembly line. Shoulders may also be formed to stop the rotation of the collars of the tangential screw type, and facilitate their tightening.

Without any subsequent finishing or reinforcement by an autoadhesive tape, the process preferably also gives a better surface quality under the collar, which therefore preferably becomes easier to tighten. It also makes possible an improved inspection of the terminal, cylindrical end portion, without the need to cut off the ends.

The cost of replacing the tooling is preferably low, and usually remains very much below the cost of any means of partial molding.

In summary, one aspect of the invention resides broadly in a forming process, during the vulcanization in an autoclave on a mandrel 2 of the extremities of tubes made of elastomer compound, characterized by the fact that a radially, deformable skirt 4, made of vulcanized elastomer compound, is connected with a rigid ring 3 or 5, against which fits its corresponding extremity 6 or 7 of the tubing or blank 1. The radially deformable skirt enclosing its corresponding extremity 6 or 7, under the action only of the circumferential elasticity of its corolla-shaped surface area 11, makes possible the reproduction of a geometry on the tubing 1. The process is further characterized by the fact that a slight axial push P on the corolla-shaped surface area 11 suffices to disengage the extremity of the piece or tubing 1 after vulcanization.

Another aspect of the invention resides broadly in a forming process for the extremities of tubes and is further characterized by the fact that the radially deformable skirt 4 is held in the upturned position 13 during the preparation at moderate temperature.

Yet another aspect of the invention resides broadly in a forming process for the extremities of tubes and is characterized by the fact that the radially deformable skirt 4 has a shape which allows it to reproduce on the extremities 6 or 7 of the tubing or blank 1, an engraved marking or a marking in relief.

Still another aspect of the invention resides broadly in a forming process for the extremities of tubes and is characterized by the fact that the radially deformable skirt 4 has a profile which permits the realization of flanges 8 in relief, for the positioning of collars on the finished tubing.

A further aspect of the invention resides broadly in a forming process for the extremities of tubes and is characterized by the fact that the flanges 8, in relief, are continuous over the periphery of the tube.

Yet another aspect of the invention resides broadly in a forming process for the extremities of tubes and is characterized by the fact that the flanges 8 are discontinuous and consist of shoulders for the positioning of collars of the tangential screw type.

A still further aspect resides broadly in tooling for the performance of the process for forming the extremities of tubes and is characterized by the fact that the radially deformable skirt 4 is fixed on a ring 3, which is permanently fastened, to the mandrel 2 or to a movable ring 5, by clamping provided by a holding collar 14 covering a maximum of one-half of the length of the ring 3 or 5, and that it slides or is slideable along the exused portion of said ring 3 or 5, when it is maneuvered by an axial thrust P on the corolla-shaped surface area 11.

All, or substantially all, of the components and methods of the various embodiments may be used with at least one embodiment of all of the embodiments, if any, described herein.

All of the patents, patent applications, and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A forming apparatus for forming at least partially unvulcanized tubing during vulcanization, said apparatus comprising:
   means for supporting and shaping in place during vulcanization at least a portion of the at least partially unvulcanized tubing;
   flexible and deformable means having a portion for surrounding an outer surface portion of the partially unvulcanized tubing and for forming at least the outer surface of said partially unvulcanized tubing during vulcanization;
   said flexible means having a substantial portion extending away from said portion for surrounding the outer surface portion of the partially unvulcanized tubing;
   said extending portion being configured for lifting said surrounding portion of said flexible means surrounding the outer surface portion away from the outer surface of the tubing upon application of a force to said extending portion for lifting said surrounding portion;
   means for deforming said flexible means from a first position surrounding the outer surface portion to a second position,
   said second position being substantially deformed from said first position upon lifting of said flexible means away from the outer surface portion of the tubing.

2. The forming apparatus for forming at least partially unvulcanized tubing during vulcanization according to claim 1, wherein said extending portion comprises a deformable skirt.

3. The forming apparatus for forming at least partially unvulcanized tubing during vulcanization according to claim 2, wherein said deformable skirt is corolla-shaped.

4. The forming apparatus for forming at least partially unvulcanized tubing during vulcanization according to claim 3, wherein:
   said flexible means has an axis for being disposed substantially parallel to the outer surface of the tubing;
   said flexible means has a first configuration wherein said surrounding portion is for being in substantial contact with the outer surface of the tubing and said deformable skirt has an axis which extends substantially radially outward from the surrounding portion;
   said deformable skirt being configured for lifting said surrounding portion away from the outer surface of the tubing upon application of a first force to said deformable skirt, said first force having a force component which is substantially parallel with the surface of said partially unvulcanized tubing; and
   said flexible means acquires a deformed configuration upon the application of said first force to said extending portion, wherein in said deformed configuration said surrounding portion is lifted away from the outer surface of the tubing, said flexible means being configured to remain in said deformed configuration.

5. The forming apparatus for forming at least partially unvulcanized tubing during vulcanization according to claim 4, wherein said means for supporting and shaping and said surrounding portion each have at least one substantially cylindrical portion.

6. The forming apparatus for forming at least partially unvulcanized tubing during vulcanization according to claim 5, wherein said surrounding portion includes means for producing patterns on the surface of the tubing in contact with said surrounding portion of said flexible means.

7. The forming apparatus for forming at least partially unvulcanized tubing during vulcanization according to claim 6, wherein said means for producing patterns comprises means for forming flanges on the tubing.

8. The forming apparatus for forming at least partially unvulcanized tubing during vulcanization according to claim 7, wherein said means for forming flanges comprises means for forming continuous flanges around the periphery of the tubing.

9. The forming apparatus for forming at least partially unvulcanized tubing during vulcanization according to claim 8, wherein said means for forming flanges comprises means for providing shoulders for positioning of collars of a tangential screw type.

10. The forming apparatus for forming at least partially unvulcanized tubing during vulcanization according to claim 6, wherein said means for producing patterns comprise means for producing imprints on the outer surface of the tubing.

11. The forming apparatus for forming at least partially unvulcanized tubing during vulcanization according to claim 8, including ring means disposed within at least a part of said surrounding portion, said surrounding portion of said flexible means being disposed adjacent to and being supported by said ring means;

the outer surface of the tubing comprising a cylindrical surface portion and also an annular end portion, said ring means for being disposed against the annular end portion of the tubing during vulcanization.

12. The forming apparatus for forming at least partially unvulcanized tubing during vulcanization according to claim 11, including means for clamping and holding said ring means about no more than one-half of the periphery of the ring means;

said holding collar means comprising at least two clamping elements, one of said elements being slideably mounted and another of said elements being mounted firmly with respect to said shaping and forming means;

said supporting and shaping means comprising a mandrel;

said flexible means comprising a vulcanized elastomer;

said pattern producing means comprising means for producing at least one of: an engraved marking, a marking in relief, a continuous pattern, a discontinuous pattern, a continuous shoulder and a discontinuous shoulder.

13. A method of forming at least partially unvulcanized tubing during vulcanization, said method comprising the steps of:

supporting the tubing prior, during and following vulcanization on means for supporting and shaping;

placing flexible and deformable means over at least a portion of an outer surface of the partially unvulcanized tubing, said flexible and deformable means having a portion for surrounding said at least a portion of an outer surface of the partially unvulcanized tubing;

said flexible means having a substantial portion extending away from the portion for surrounding the outer surface of the partially unvulcanized tubing, the extending portion being configured for lifting the surrounding portion of the flexible means surrounding the portion of the outer surface portion away from the outer surface of the at least partially unvulcanized tubing upon application of a force to the extending portion for lifting the surrounding portion;

applying a first force to said extending portion to deform said flexible means to a deformed configuration and thus lift the portion for surrounding away from the means for supporting and shaping said flexible means maintaining said deformed configuration;

placing the at least partially unvulcanized tubing on the supporting and shaping means so that the supporting and shaping means is in contact with the inner surface of the tubing prior to vulcanization of the tubing;

applying a second force opposite to the first force to said extending portion to reform said flexible means to place the surrounding portion into contact with said at least a portion of the outer surface of the tubing;

heating the tubing to vulcanization temperature;

applying pressure from the surrounding portion onto the tubing during vulcanization to shape the surface of the tubing;

applying said first force to the extending portion to deform said flexible means into said deformed configuration and thus lift the surrounding portion of the flexible means away from the vulcanized tubing subsequent to vulcanization, said flexible means maintaining said deformed configuration; and then removing the tubing from the supporting and shaping means.

14. The method for forming at least partially unvulcanized tubing during vulcanization according to claim 13, wherein the extending portion comprises a deformable skirt being configured to extend substantially radially outward form the tubing which is adjacent to the flexible means; and applying said force to the deformable skirt.

15. The method for forming at least partially unvulcanized tubing during vulcanization according to claim 14, wherein the deformable skirt is corolla-shaped and where said force is applied to the corolla-shaped portion of the deformable skirt.

16. The method for forming at least partially unvulcanized tubing during vulcanization according to claim 15, including holding the extending portion in an upturned position during preparation at a moderate temperature prior to vulcanization.

17. The method for forming at least partially unvulcanized tubing during vulcanization according to claim 16, wherein the flexible means has an axis which is disposed substantially parallel to the outer surface of the tubing:

said force, being applied to the deformable skirt lifts the surrounding portion away from the outer surface of the tubing: and said force has a component which is substantially parallel to the surface of the partially unvulcanized tubing and the force has a substantial component substantially parallel to said axis.

18. The method for forming at least partially unvulcanized tubing during vulcanization according to claim 17, including producing patterns on the surface of the tubing in contact with the surrounding portion of the flexible means with means for producing patterns.

19. The method for forming at least partially unvulcanized tubing during vulcanization according to claim 18, including forming flanges on the tubing with the means for producing patterns;

20. The method for forming at least partially unvulcanized tubing during vulcanization according to claim 19, including forming continuous flanges around the periphery of the tubing with the means for producing patterns.

21. The method for forming at least partially unvulcanized tubing during vulcanization according to claim 20, including forming flanges on the tubing for providing shoulders for positioning of collars of a tangential screw type.

22. The method for forming at least partially unvulcanized tubing during vulcanization according to claim 21, including forming
imprints on the outer surface of the tubing.

23. The method for forming at least partially unvulcanized tubing during vulcanization according to claim 22, including disposing ring means within at least a part of said surrounding portion, the ring means being adjacent to said surrounding portion of said flexible means;
said outer surface of said tubing comprising a cylindrical surface portion and an annular end portion; and
placing said ring means against the annular end portion of the tubing during vulcanization.

24. A method of forming at least partially unvulcanized tubing during vulcanization, said method comprising the steps of:
supporting the tubing prior, during and following vulcanization on means for supporting;
placing flexible means over at least a portion of an outer surface of said partially unvulcanized tubing, said flexible means having a portion for surrounding said at least a portion of an outer surface of said partially unvulcanized tubing;
said flexible means having a substantial portion extending away from said portion for surrounding the outer surface of the partially unvulcanized tubing;
said extending portion being configured for lifting said surrounding portion of said flexible means surrounding the portion of the outer surface portion away from the surrounding portion of the outer surface of the at least partially unvulcanized tubing upon application of a force to said extending portion for lifting said surrounding portion;
applying a force to said extending portion of the flexible means to deform the flexible means to a deformed configuration and thus lift the portion for surrounding away from the means for supporting;
inserting the at least partially unvulcanized tubing on the supporting means prior to vulcanization of the tubing;
releasing the extending portion to reform said flexible means so that the surrounding portion surrounds at least a portion of the outer surface;
heating the tubing to vulcanization temperature;
applying pressure from the surrounding portion onto the tubing during vulcanization;
applying a force to the extending portion to deform the flexible means into said deformed configuration and thus lift the surrounding portion of the flexible means away from the vulcanized tubing subsequent to vulcanization; and
then removing the tubing from the supporting means.

* * * * *

UNITED STATES PATENT AND TRADEMARK OFFICE
CERTIFICATE OF CORRECTION

PATENT NO. : 5,055,251

DATED : October 8, 1991

INVENTOR(S) : Armand LEBARBIER and Michel DESCHAMPS

It is certified that error appears in the above-identified patent and that said Letters Patent is hereby corrected as shown below:

ON TITLE PAGE: under the Title of the Invention section, indicated by INID code [54], delete "PROCES" and insert --PROCESS--.

In column 2, line 6, delete "cutting-tolength" and insert --cutting-to-length--.

In column 4, line 38, delete "means:" and insert --means;--.

In column 7, line 20, before "skirt" insert --tooling constituted by the radially deformable skirt 4b. The--.

In column 7, line 21, delete "tooling constituted".

In column 7, line 22, delete "by the radially deformable skirt 4b. The".

UNITED STATES PATENT AND TRADEMARK OFFICE
CERTIFICATE OF CORRECTION

PATENT NO. : 5,055,251

DATED : October 8, 1991

INVENTOR(S) : Armand LEBARBIER and Michel DESCHAMPS

It is certified that error appears in the above-identified patent and that said Letters Patent is hereby corrected as shown below:

In column 8, line 19, delete "(FK)." and insert --(FKM).--

In column 8, line 36, delete "of", third occurrence, and insert --on--.

Claim 14, line 5 delete "form" and insert --from--.

Claim 17, line 5, delete "tubing:" and insert --tubing;--.

Claim 17, line 8, delete "tubing:" and insert --tubing;--.

Claim 23, line 7, delete "portion:" and insert --portion;--.

Signed and Sealed this

Eleventh Day of February, 1992

*Attest:*

HARRY F. MANBECK, JR.

*Attesting Officer*     *Commissioner of Patents and Trademarks*